March 22, 1955

E. H. JOHNSON 2,704,391

INDEXING MECHANISM

Filed Dec. 10, 1953

INVENTOR.
ERNEST H. JOHNSON
BY
Paul M. Gist

March 22, 1955   E. H. JOHNSON   2,704,391
INDEXING MECHANISM
Filed Dec. 10, 1953   3 Sheets-Sheet 2
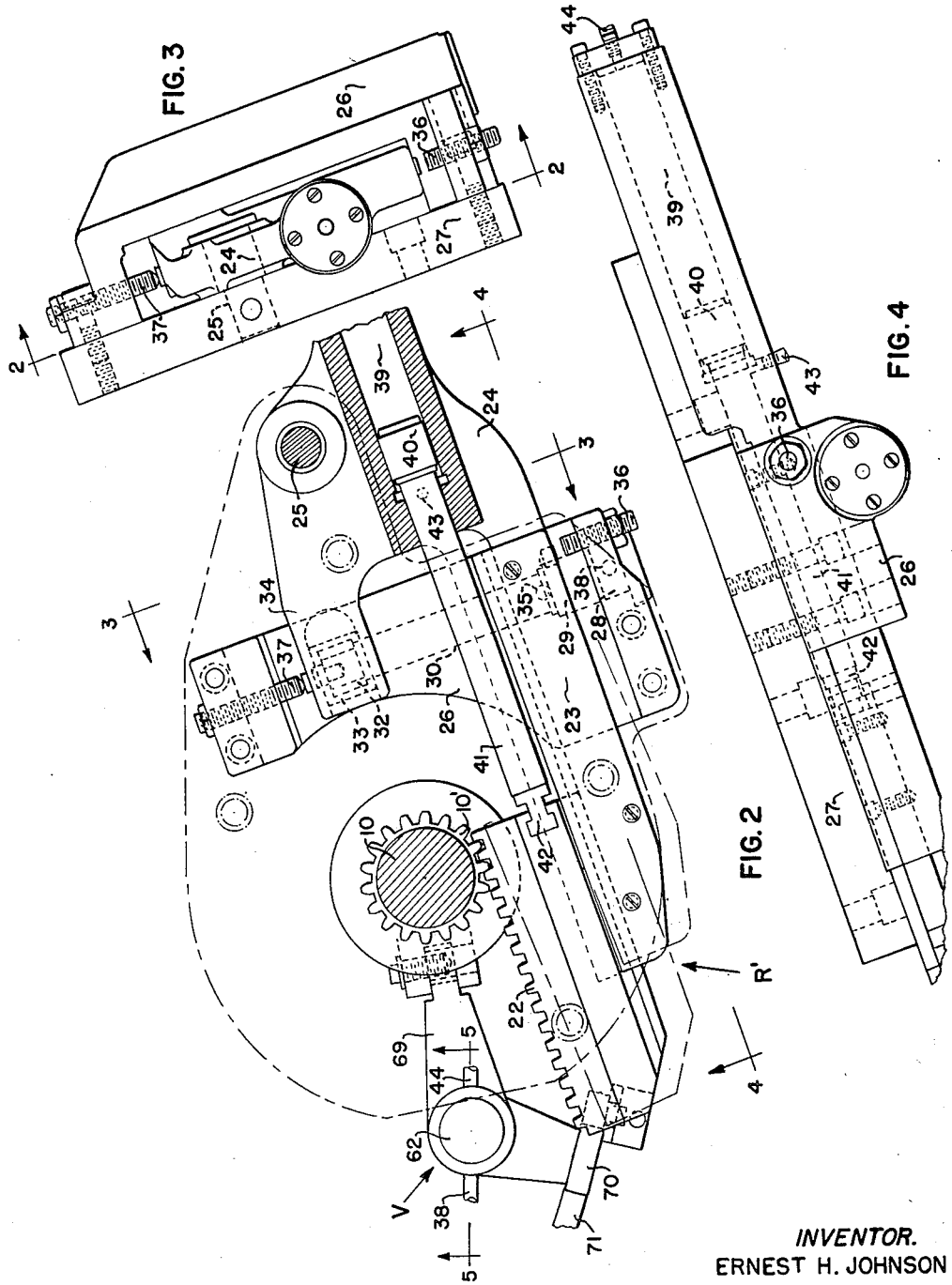
INVENTOR.
ERNEST H. JOHNSON March 22, 1955

E. H. JOHNSON 2,704,391

INDEXING MECHANISM

Filed Dec. 10, 1953

INVENTOR.
ERNEST H. JOHNSON
BY
Paul M. Geist.

United States Patent Office 2,704,391
Patented Mar. 22, 1955

2,704,391

INDEXING MECHANISM

Ernest H. Johnson, Bridgeport, Conn., assignor to The Bullard Company, a corporation of Connecticut Application December 10, 1953, Serial No. 397,337

19 Claims. (Cl. 29—38)

The present invention relates to machine tools and particularly to a new and improved registering attachment for a multiple spindle lathe, wherein the spindles are successively moved into and out of a loading station.

In the mass production of articles on multiple spindle lathes, such for example on machines of the type generally shown in U. S. Patent 2,356,028 to E. P. Bullard III, it is often required to machine irregularly-shaped parts that must be held on the rotatable spindles. Usually in such machine tools various tooling arrangements are mounted in close proximity to the work-supporting spindles which makes it difficult to remove the workpiece from the spindle except when it is in a specific rotational position. Other difficulties arise where the workpiece must be mounted on the spindle at a specific rotative location where multiple drilling operations are required simultaneously to be performed requiring accurate registration of the drills and the work.

The principal object of the present invention is to provide an attachment for a machine tool adapted to effect proper registration of the work-supporting spindle to properly locate it for the removal and replacement of workpieces.

Other objects of the invention include the provision of a spindle registering attachment capable of being rendered effective during the time the work-supporting spindle is located in the loading and unloading station of the multiple spindle machine tool, and to be ineffective during the movement of the work-supporting spindle through succeeding work locations; the provision of such an attachment that is adapted sequentially to stop the work-supporting spindle and index it to a predetermined position thereby to facilitate the removal and replacement of work on the work-supporting spindle; the provision of such an attachment in which a brake is applied to the spindle after its driving clutch has been disengaged, which brake is released prior to the indexing of the spindle by the registering attachment; the provision of such an attachment embodying an opposed hydraulic and mechanical force-developing means for registering the spindle while it is at the loading and unloading station; and the provision of such an attachment that will sequentially stop the spindle from rotating, position a snubbing detent relatively to cooperating means on the spindle, initiate the hydraulic indexing of the spindle to effect cooperation between the snubbing detent and the cooperating means, and release the snubbing detent as the spindle passes through the loading station.

The above, as well as other objects and novel features of the invention will become apparent from the following specification and accompanying drawings in which:

Figure 1 is a sectional elevational view of a portion of a multiple spindle machine tool to which the principles of the invention have been applied;

Fig. 2 is a sectional plan view taken substantially along the line 2—2 of Figs. 1 and 5, and 3;

Fig. 3 is an end view taken substantially along line 3—3 of Fig. 2;

Fig. 4 is a view taken substantially along line 4—4 of Fig. 2;

The principles of the present invention are shown and will be described as applied to a work-supporting spindle of a machine tool of the type shown, described and claimed in U. S. Patent 2,356,028, in the name of E. P. Bullard III, to which patent reference is made for specific details of construction not shown in the present case.

Figures 1, 5:
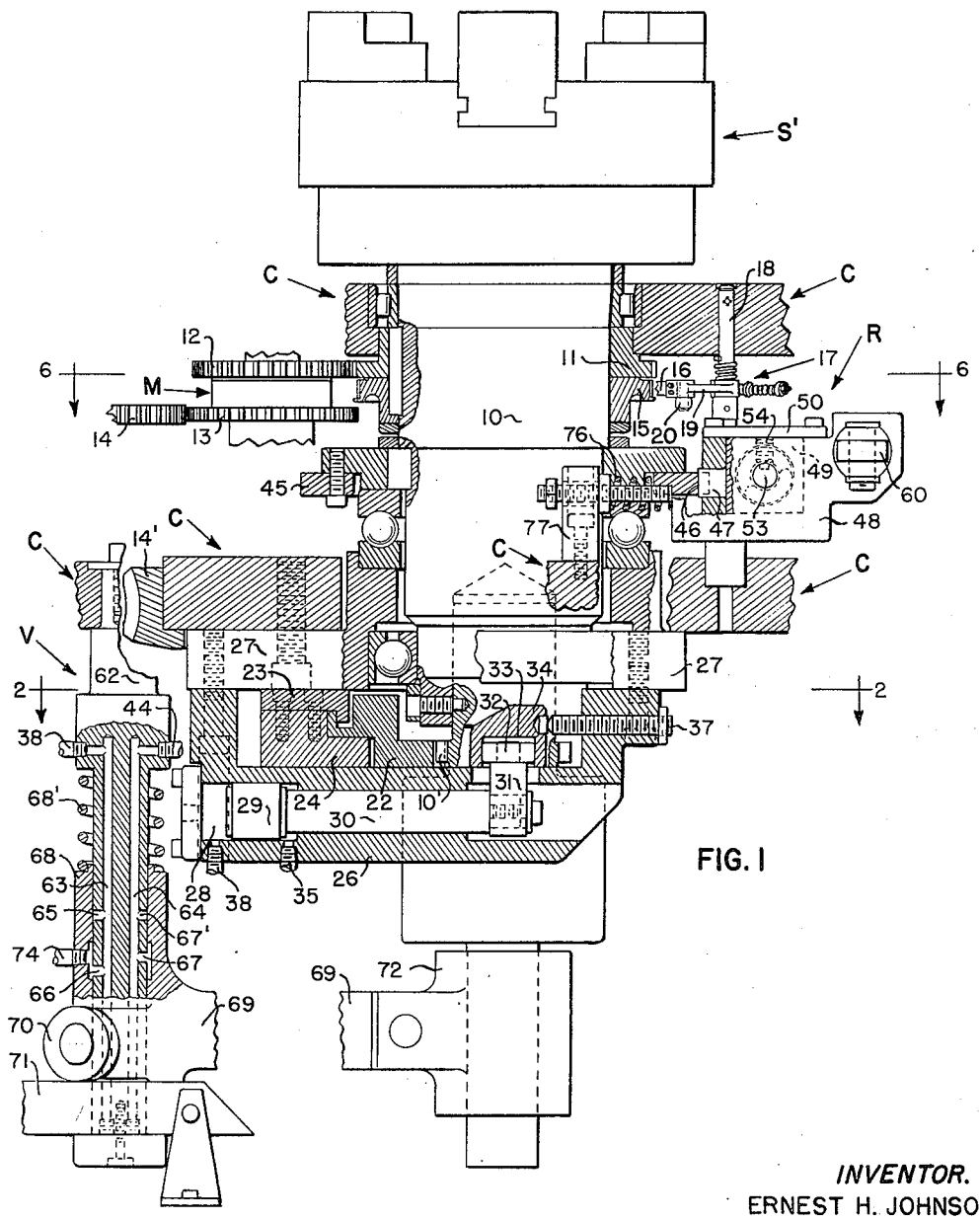
Fig. 5 is a sectional elevational view taken along line 5—5 of Fig. 2.

Referring to the drawings, and particularly to Fig. 1, a work-supporting spindle S' is mounted for rotation in bearings located within a carrier C. The carrier C and the spindle S' are substantially the same as the same elements in the above-referred-to patent. The work spindle S' includes a depending portion 10 to which is keyed a spur gear 11 that meshes with a spur gear 12. The spur gear 12 is connected to another spur gear 13 through a synchronizing mechanism M, similar to that shown in the above-referred-to patent. The spur gear 13 is adapted to be rotated by a bull gear 14. The gears 11, 12, 13 and 14 of Fig. 1 correspond to the gears 37, 36, 35 and 34 of the above-referred-to patent. Accordingly, the work-supporting spindle S' is capable of being rotated while it passes in an orbital path about a central column of the machine tool by the action of a gear 14' which latter is driven in the same way that gear 25 of the above-identified patent is driven.

The depending portion 10 of the work-supporting spindle S' is also provided with a brake drum 15 adapted to be rotated with the spindle S'. A brake band 16 has its one end anchored to a rigid support fixed to the carrier C through shaft 18 while its opposite end is connected to the end of one arm of a bell crank 17 (Fig. 6) that is pivoted on a shaft 18 fixed to the carrier C. The end 19 of the bell crank 17 opposite that to which the brake 15 is attached, is provided with a cam roller 20 adapted to cooperate with a cam 21 fixed to the stationary housing of the machine tool. The location of the cam 21 is such that as the spindle S' moves into the loading station, and after the synchronizing mechanism M has been operated to disengage its clutch so that the spindle S' is idling, the brake band 16 becomes effective to stop the spindle. This permits an operator to remove a finished workpiece from the spindle S', and to replace it with one to be processed.

In order to cause the spindle S' to stop at the correct rotative position to facilitate removal of the workpiece, a registering mechanism R' is provided. It comprises a rack 22 (Fig. 2) adapted to be reciprocated in a slide bearing 23 forming part of a bracket 24 pivotally mounted on a shaft 25 fixed to the carrier C. The bracket 24 is supported by a plate 26 (Fig. 3) which latter is fixed to the carrier C, and spaced therefrom by an intermediate member 27.

The plate 26 (Fig. 1) is provided with a cylinder 28 within which a piston 29 is adapted to be reciprocated. The piston 29 is provided with a piston rod 30 that is connected to a pin 31 arranged at right angles to the piston rod 30. A rectangularly-shaped block 32 is journaled on the pin 31 and it mates with a corresponding rectangularly-shaped recess 33 within one arm 34 of the pivotally mounted bracket 24. Liquid under pressure is adapted constantly to be supplied to the cylinder 28 through a duct 35 tending to move the piston 29 leftwardly (Fig. 1) and, consequently, the bracket 24 and rack 22 in a counter-clockwise direction (Fig. 2), out of meshing relation with a pinion 10' fixed to the lower portion 10 of the spindle S'. The plate 26 includes a set screw 36 for limiting the counter-clockwise motion of the bracket 24, as well as a set screw 37 for limiting the clockwise movement thereof. This latter set screw 37 is adjustable so that clockwise movement of the bracket 24 about its pivot 25 is limited to effect proper intermeshing between the teeth of the rack 22 and those of the spur gear 10'. Liquid under pressure is adapted to be supplied to the cylinder 28 through a connection 38 that is connected to a valve structure V (Fig. 5) for a purpose to be described later.

The bracket 24 (Fig. 2) includes a cylinder 39 at right angles to the cylinder 28 and supports a piston 40 therein for reciprocation. The piston 40 is provided with a piston rod 41 that is attached to the rack 22 through a square-lock connection 42. Liquid under pressure in constantly supplied to the left-hand side of the piston 40 through a connection 43. Liquid under pressure is adapted to be supplied to the right-hand side of the piston 40 within the cylinder 39 through a connection 44 that in turn is connected to the valve V (Fig. 5).

From an inspection of Figs. 1 and 4, it is evident that the left- and right-hand sides of the pistons 40 and 29 respectively have substantially smaller areas exposed to the constant pressure liquid than the right- and left-hand faces respectively. Accordingly, admission of liquid under pressure through the connections 38 and 44 will cause the piston 29 to move rightwardly (Fig. 1) and the piston 40 to move leftwardly (Fig. 2). Exhausting of either of these connections 38 and 44 will immediately cause the pressure liquid flowing through connections 35 and 43 to move the piston 29 leftwardly (Fig. 1) and the piston 40 rightwardly (Fig. 2).

Leftward movement of the piston 40 (Fig. 2) within the cylinder 39 while the rack 22 is in meshing relation with the spur gear 10' causes the spindle S' to be rotated in a clockwise direction.

Figure 6:
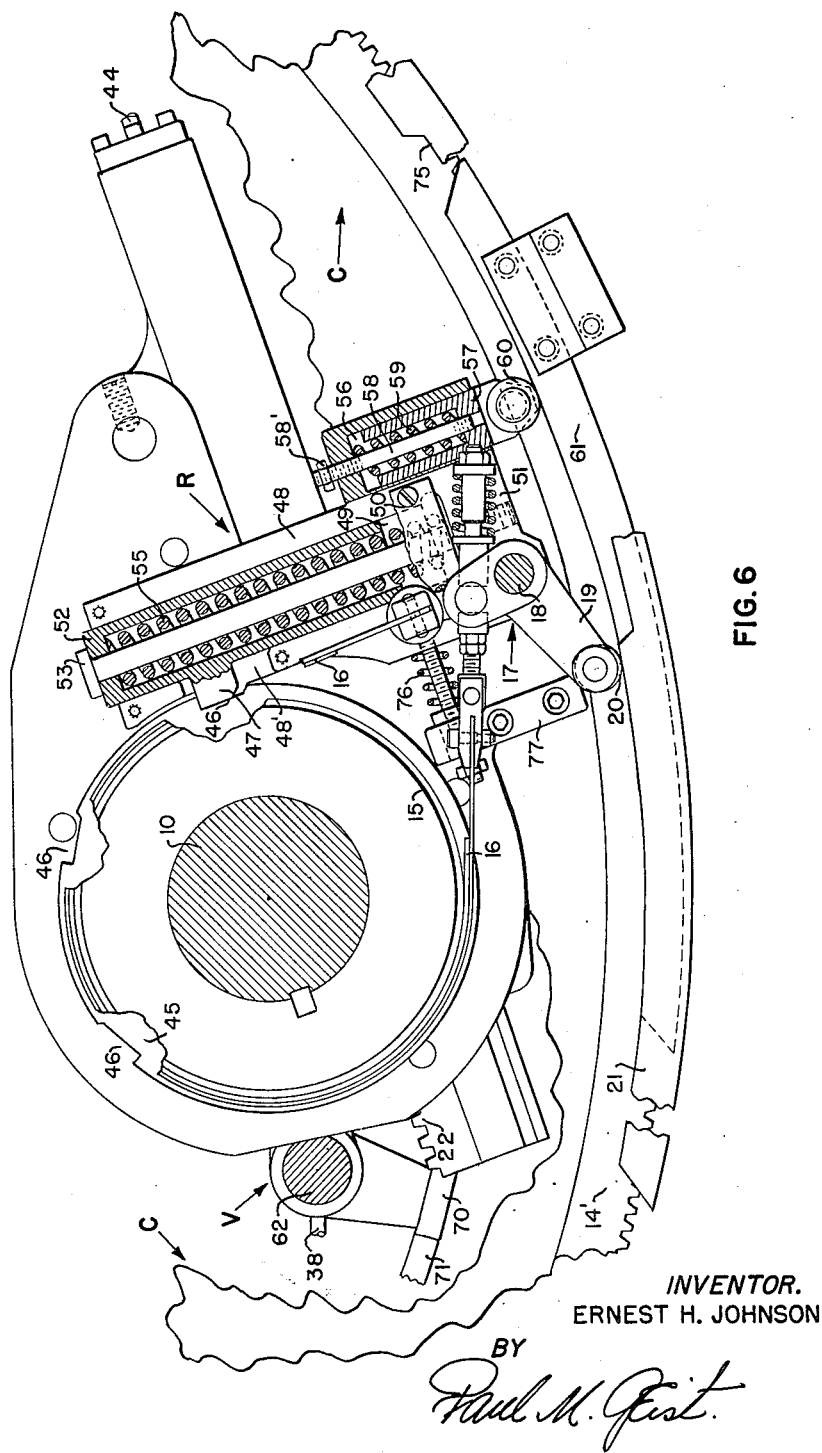
Fig. 6 is a sectional plan elevational view taken substantially along line 6—6 of Fig. 1.

Referring to Figs. 1 and 6, the lower portion 10 of the spindle S' is provided with a disc 45 having a plurality of notches 46 arranged around its periphery. These notches 46 are adapted to cooperate with a detent 47 of a recoil mechanism R. The recoil mechanism R includes a housing 48 that is pivotally mounted on the shaft 18 that supports the bell crank 17, but at a lower elevation. The housing 48 includes a channel 49 adapted to be covered by a top plate 50 forming a rectangular cavity within housing 48 and ending in a solid bottom portion 51. A mating housing member 52 of rectangular cross-section is adapted to be reciprocated within the passage 49 and it includes the detent 47 that extends outwardly of the housing 48 through a slot 48' within the one side wall of the member 48. The member 52 is hollow and includes an open inwardly-disposed end, and a closed outwardly-disposed end. A headed pin 53 passes through the closed outer end of the member 52 and is screw threaded into the base 51 of the pivotally mounted member 48. A set screw 54 (Fig. 1) locks the threaded end of the pin 53 securely to the pivotally mounted member 48 in adjusted position. A compression spring 55 is located within the member 52 and abuts against the bottom 51 of the pivotal member 48 and the inner surface of the top of the reciprocable member 52. The construction and arrangement of the parts are such that when the detent 47 is in cooperating relationship with one of the notches 46, the member 52 can be moved in a manner to compress the spring 55, thereby snubbing the rotative motion of spindle S'. Subsequently, spring 55 reverses the movement of the spindle S' until the top of the reciprocable member 52 engages the head of the pin 53, thereby locating the spindle S' in a position to effect easy removal of the work, or proper registration of tools relatively to the work.

The pivotally mounted housing member 48 also includes an open ended pocket portion 56 within which a telescoping member 57 is adapted to be reciprocated. The telescoping member 57 has fixed to it a bolt 58 that extends up through the top of the pocket portion 56, and a locking nut 58' thereon limits the outward movement of the member 57. A compression spring 59 urges the member 57 outwardly. The outer end of the member 57 supports a cam roller 60 adapted to cooperate with a cam 61 fixed to that portion of the frame of the machine that supports the cam 21. The location of the cam 61 relatively to the cam 21 is critical and will be described later.

In order to cause the spindle S' to be rotated to effect cooperation between one of the notches 46 and the detent 47, the valve mechanism V is provided. Referring to Fig. 5, the valve mechanism V includes a portion 62 fixed to the carrier C. The portion 62 is provided with vertically disposed passages 63 and 64 to which transverse ports 65, 66, 67 and 67' are in communication therewith. A valve sleeve 68 is fixed to an arm 69 that is adapted to be reciprocated by the action of a spring 68', a cam roller 70 journaled on a pin fixed to the arm 69, and a cam 71 that is in fixed relation relatively to the cams 61 and 21 previously described. The arm 69 is provided with a sleeve 72 that slides along the lower end of the spindle S' for guiding the sleeve 68.

With the parts in the position shown in the drawings, high pressure liquid flows into the valve V (Fig. 5) from an inlet 74, thence through the duct 63, the passage 38, to the left-hand side of the piston 29 (Fig. 1) within the cylinder 28, forcing it rightwardly against the action of the constant pressure within the right-hand side of the cylinder 28 that is supplied through the duct 35. Inasmuch as the area of the left-hand side of the piston 29 is substantially greater than that of the right-hand side, the piston 29 moves rightwardly and forces the rack 22 (Fig. 2) into mesh with the teeth of the gear 10' on the lower part 10 of the spindle S'. Additionally, liquid under pressure from the inlet 74 of valve V passes through the duct 64 thereof to the line 44, thence to the right-hand side of the piston 40 (Figs. 2 and 4) within the cylinder 39, forcing it leftwardly against the action of the constant pressure from the line 43, thereby moving the rack 22 leftwardly and rotating the spindle S' in a clockwise direction until one of the notches 46 engages the detent 47.

The location of the notches 46 about the periphery of the disc 45 is such that during the movement of the spindle S' by the maximum stroke of the rack 22, at least one of these notches will come into registration with the detent 47. This registration, of course, may occur before the rack 22 has made its complete advance stroke, whereupon the housing 52 moves in a manner to compress the spring 55 and bring the spindle S' to a stop relatively softly. One characteristic of the spring 55 is that it is strong enough to overcome the force exerted by the piston 40 within the cylinder 39 and, therefore, reverses the rotation of the spindle S' until spring 55 returns the housing 52 to abutting relation with the head of the bolt 53. This location of spindle S' is the critical location, and can be changed by adjusting the bolt 53 that is threaded into the bottom 51 of housing 48.

The cams 21, 61 and 71 are arranged on the stationary portion of the machine tool in such a manner that the following sequence of operations occurs as the spindle S' moves into the loading and unloading station of the machine tool. Initially, the synchronizing mechanism M is operated by the mechanism shown in the Patent 2,356,028, to disengage the synchronizing clutch causing the spindle S' to idle. Thereafter, cam roller 20 engages the rightmost portion of the cam 21 (Fig. 6), thereby applying the brake to the spindle S' and stopping its rotation. The next step in the sequence of operations is that the roll 20 drops into the recessed portion 75 of the cam 21, thereby releasing the brake. The roll 60 then engages the cam 61 and pivots the housing 48 about the shaft 18, forcing the detent 47 into engagement with the outer periphery of the disc 45. In most instances the detent 47 will not immediately engage a notch 46, but will abut the outer peripheral surface of the disc 45. Accordingly, the telescoping member 57 moves inwardly against the action of the spring 59 to prevent breakage of the apparatus and as one of the notches 46 comes into cooperating position relatively to the detent 47, the spring 59 expands, thereby forcing the housing 48 further about its pivot 18 until the detent 47 seats completely within one of the notches 46. Prior to the cooperation between the notch 46 and the detent 47, and after the housing 48 has been pivoted about the pin 18 by the action of the cam roller 60 on the cam 61, the roller 70 is caused to cooperate with its cam 71, thereby moving the valve sleeve 68 vertically upwardly. As the cam sleeve 68 moves upwardly, the port 66 is at a location relatively to the port 67 such that it receives liquid under pressure before port 67. Accordingly, piston 29 is caused to move rightwardly (Fig. 1) before piston 40 is caused to move leftwardly (Fig. 2) so that the rack 22 is pivoted inwardly into meshing relation with the spur gear 10' on the spindle S' before the piston 40 moves leftwardly. Accordingly, as the piston 40 begins its leftward movement, the spindle S' is rotated in a clockwise direction to effect proper cooperation between the notches 46 and the detent 47. When such cooperation exists, the housing 52 moves in opposition to the spring 55 initially, and then the spring 55 takes over, returning the housing 52 to the proper position where it abuts the head of the bolt 53 thereby effecting proper registration of the spindle S' for the purposes intended. When this has occurred, the cam roller 20 is acted on by another effective portion of the cam 21 to apply the brake and hold the spindle in its proper registered position until the finished workpiece has been removed and replaced by an unfinished piece. As the spindle S' begins its movement away from the loading station, the valve cam roller 70 falls off the cam 71 and the sleeve 68 moves vertically downwardly due to the action of spring 68', thereby uncovering the valve ports 65 and 67', while at the same time blocking off the passage of pressure liquid in the line 74. Exhausting the passages 63 and 64 causes the pistons 29 and 40 to move to their initial positions by the action of the constant pressure within the lines 35 and 43, thereby re-setting the apparatus for subsequent registering operations. Thereafter, cam rollers 20 and 60 pass beyond the effective portions of their cams 21 and 61, respectively, whereupon the brake is released. A spring 76 (Figs. 1 and 6) between a fixed abutment 77 mounted on the carrier C and the housing 48 pivots the housing 48 in a clockwise direction about the shaft 18, thereby removing the detent 47 from engagement with the notch 46 of the disc 45 with which it was in cooperation. Thereafter, the mechanism shown in Patent 2,356,028 operates the synchronizing mechanism M in a manner described therein to bring the spindle S' up to its proper speed for subsequent machining operations on the work attached to the spindle S'.

Although the various features of the new and improved spindle registering mechanism have been shown and described in detail to fully disclose one embodiment of the invention, it is evident that numerous features may be used without others without departing from the principles of the invention.

What is claimed is:

1. Apparatus comprising in combination, a carrier adapted to support a plurality of rotatable work-supporting spindles and adapted to be moved in a manner to cause said spindles to be moved toward and from a work-loading station; brake means adapted to be rendered effective by the movement of said carrier for stopping the rotation of a spindle as the latter approaches the loading station; means rendered effective by the continued movement of said carrier for indexing said spindle while it is in the loading station; and means rendered effective in advance of the rendering effective of said spindle-indexing means and adapted to cooperate with said indexing mechanism for positively stopping said spindle at a predetermined rotative position.

2. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of a spindle as the latter approaches the loading station; snubbing means rendered effective by the continued movement of said carrier; means for indexing said spindle; and means on said spindle adapted to cooperate with said snubbing means and adapted positively to stop said spindle at a predetermined rotative position.

3. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of said spindle as it approaches the loading station; a pivotally-mounted rack; hydraulic means adapted to move said rack into meshing relationship with a pinion on said spindle when said spindle is at rest at the loading station; hydraulic means for moving said rack to thereby index said spindle while the latter is at the loading station; valve means operated by the movement of said carrier for rendering effective both said hydraulic means; and means rendered effective in advance of the operation of said valve means and adapted to cooperate with said spindle-indexing means for positively stopping said spindle at a predetermined rotative position.

4. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of said spindle as it approaches the loading station; snubbing mechanism; means rendered effective by the continued rotation of said carrier for causing said snubbing mechanism to be moved into effective position relatively to said spindle; a pivotally-mounted rack adapted to be moved into meshing relationship with a pinion on said spindle; hydraulically-actuated mechanism for moving said rack into meshing relation with said pinion; and hydraulically-actuated mechanism for moving said rack to cause said spindle to cooperate with said snubbing means, thereby to index said spindle and stop it at a predetermined rotative position.

5. Apparatus comprising in combination, a carrier adapted to support a plurality of rotatable work-supporting spindles, and adapted to be moved in a manner to cause said spindles to be moved toward and from a work-loading station; means for continuously rotating said work-supporting spindles about their respective axes while said carrier is moved; means for disengaging each work-supporting spindle rotating means as it approaches the work-loading station; brake means rendered effective by the movement of said carrier for stopping the rotation of said spindle after its rotating means has become disengaged; snubbing means mounted on said carrier for each of said spindles; means adapted to move said snubbing means into effective position as the work-supporting spindles are moved into said loading station; and hydraulically-actuated means for causing cooperation between said spindle and said snubbing means to index and stop said spindle at a predetermined rotative position.

6. Apparatus comprising in combination, a carrier adapted to support a plurality of rotatable work-supporting spindles, and adapted to be moved in a manner to cause said spindles to be moved toward and from a work-loading station; means for causing said work-supporting spindles to be rotated on their respective axes; means for disengaging the drive of said work-supporting spindles as they approach said work-loading station; brake means adapted to be rendered effective by the movement of said carrier for stopping the rotation of a spindle as it approaches the work-loading station; snubbing means adapted to be moved into effective position when a work-supporting spindle is at the work-loading station; auxiliary spindle-turning mechanism adapted to be rendered effective when said work-supporting spindle is at said loading station; and means for causing cooperation between said auxiliary work-supporting spindle-rotating means and said snubbing means to index and stop said work-supporting spindle at a predetermined rotative position.

7. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of a spindle as the latter approaches the loading station; means for releasing said brake when said spindle has stopped; means rendered effective by the continued movement of said carrier for indexing said spindle while it is in the loading station; means rendered effective in advance of the rendering effective of the spindle-indexing means and adapted to cooperate with said indexing mechanism for positively stopping said spindle at a predetermined rotative position; and means for re-applying said brake means when said spindle is at said predetermined rotative position.

8. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of said spindle as it approaches the work-loading station; means for releasing said brake means upon the stopping of said spindle; a pivotally-mounted rack; hydraulic means adapted to move said rack into meshing relationship with a pinion on said spindle when said spindle is at rest at the loading station; hydraulic means for moving said rack to thereby index said spindle while the latter is at the loading station; valve means operated by the movement of said carrier for rendering effective both said hydraulic means; means rendered effective in advance of the operation of said valve means and adapted to cooperate with said spindle-indexing means for positively stopping said spindle at a predetermined rotative position; and means for re-applying said brake means when said spindle has been stopped at its predetermined rotative position.

9. Apparatus comprising in combination, a carrier adapted to support a plurality of rotatable work-supporting spindles and adapted to be moved in a manner to cause said spindles to be moved toward and from a work-loading station; means for continuously rotating said work-supporting spindles about their respective axes while said carrier is moved; means for disengaging each work-supporting spindle rotating means as it approaches the work-loading station; brake means rendered effective by the movement of the carrier for stopping the rotation of said spindle after its rotating means has become disengaged; means for releasing said brake means when said spindle has stopped; snubbing means mounted on said carrier for each of said spindles; means adapted to move said snubbing means into effective position as the work-supporting spindles are moved into said loading station; hydraulically-actuated means for causing cooperation between said spindle and said snubbing means to index and stop said spindle at a predetermined rotative position; and means for re-applying said brake means when said spindle has been stopped at said predetermined rotative position.

10. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of a spindle as the latter approaches the loading station; snubbing means rendered effective by the continued movement of said carrier; means for indexing said spindle; means on said spindle adapted to cooperate with said snubbing means and adapted positively to stop said spindle at a predetermined rotative position; and means for moving said indexing means to an ineffective position upon said spindle being stopped at said predetermined rotative position.

11. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of said spindle as it approaches the work-loading station; snubbing mechanism; means rendered effective by the continued rotation of said carrier for causing said snubbing mechanism to be moved into effective position relatively to said spindle; a pivotally-mounted rack adapted to be moved into meshing relationship with a pinion on said spindle; hydraulically-actuated mechanism for moving said rack into meshing relationship with said pinion; hydraulically-actuated mechanism for moving said rack to cause said spindle to cooperate with said snubbing means, thereby to index said spindle to stop it at a predetermined rotative position; and means for exhausting the hydraulically-actuated mechanisms to thereby render it ineffective upon the stopping of said spindle at said predetermined rotative position.

12. Apparatus comprising in combination, a carrier adapted to support a plurality of rotatable work-supporting spindles, and adapted to be moved in a manner to cause said spindles to be moved toward and from a work-loading station; means for causing said work-supporting spindles to be rotated on their respective axes; means for disengaging the drive of said work-supporting spindles as they approach the work-loading stations; brake means rendered effective by the movement of said carrier for stopping the rotation of a spindle as it approaches the work-loading station; snubbing means adapted to be removed into effective position when a work-supporting spindle is at the work-loading station; auxiliary spindle-turning mechanism adapted to be rendered effective when said work-supporting spindle is at said loading station; means for causing cooperation between said auxiliary work-supporting spindle-rotating means and said snubbing means to index and stop said work-supporting spindle at a predetermined rotative position; and means for rendering ineffective said auxiliary spindle-turning mechanism when said spindle has been stopped at said predetermined rotative position.

13. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of a spindle as the latter approaches the loading station; means for releasing said brake when said spindle has stopped; means rendered effective by the continued movement of said carrier for indexing said spindle while it is in the loading station; means rendered effective in advance of the rendering effective of said spindle-indexing means and adapted to cooperate with said indexing mechanism for positively stopping said spindle at a predetermined rotative position; means for re-applying said brake when said spindle has been stopped at said predetermined rotative position; means for rendering said spindle-indexing means ineffective upon the re-application of said brake means; and means for rendering ineffective the means that positively stops said spindle at said predetermined rotative position.

14. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of said spindle as it approaches the loading station; a pivotally-mounted rack; hydraulic means adapted to move said rack into meshing relationship with a pinion on said spindle when said spindle is at rest at the loading station; hydraulic means for moving said rack to thereby index said spindle while the latter is at the loading station; valve means operated by the movement of said carrier for rendering effective both said hydraulic means; means rendered effective in advance of the operation of said valve means and adapted to cooperate with said spindle-indexing means for stopping said spindle at a predetermined rotative position; means for re-applying said brake upon the stopping of said spindle at said predetermined position; and means for operating said valve means to render ineffective said hydraulic means.

15. Apparatus comprising in combination, a carrier adapted to support a plurality of rotatable work-supporting spindles, and adapted to be moved in a manner to cause said spindles to be moved toward and from a work-loading station; means for continuously rotating said work-supporting spindles about their respective axes while said carrier is moved; means for disengaging each work-supporting spindle-rotating means as it approaches the work-loading station; brake means rendered effective by the movement of said carrier for stopping the rotation of said spindle after its rotating means has become disengaged; means for releasing said brake means upon the stopping of said spindle; snubbing means mounted on said carrier for each of said spindles; means adapted to move said snubbing means into effective position as the work-supporting spindles are moved into said loading station; hydraulically-actuated means for causing cooperation between said spindle and said snubbing means to index and stop said spindle at a predetermined rotative position; means for re-applying said brake means upon the stopping of said spindle at said predetermined rotative position; means for rendering ineffective said hydraulically-actuated means and for rendering said snubbing means ineffective after said spindle has been indexed to said predetermined rotative position.

16. Apparatus comprising in combination, a carrier adapted to support a plurality of rotatable work-supporting spindles, and adapted to be moved in a manner to cause said spindles to be moved toward and away from a work-loading station; brake means adapted to be rendered effective by the movement of said carrier for stopping the rotation of a spindle as the latter approaches the work-loading station; means for releasing said brake upon the stopping of said spindle; snubbing means rendered effective by the continued movement of said carrier; means for indexing said spindle; means on said spindle adapted to cooperate with said snubbing means and adapted positively to stop said spindle at a predetermined rotative position; means for re-applying said brake when said spindle has been stopped at said predetermined rotative position; means for rendering said indexing means ineffective; means for rendering said snubbing means ineffective; and means for releasing said brake prior to the movement of said spindle from said loading station.

17. Apparatus comprising in combination, a carrier adapted to support a plurality of rotatable work-supporting spindles, and adapted to be moved in a manner to cause said spindles to be moved toward and from a work-loading station; brake means adapted to be rendered effective by the movement of said carrier for stopping the rotation of said spindle as it approaches the loading station; means for releasing said brake upon the stopping of said spindle; snubbing mechanism; means rendered effective by the continued rotation of said carrier for causing said snubbing mechanism to be moved into effective position relatively to said spindle; a pivotally-mounted rack adapted to be moved into meshing relationship with a pinion on said spindle; hydraulically-actuated mechanism for moving said rack into meshing relation with said pinion; hydraulically-actuated mechanism for moving said rack to cause said spindle to cooperate with said snubbing means, thereby to index said spindle and stop it at a predetermined rotative position; means for re-applying said brake upon the stopping of said spindle at said predetermined rotative position; means for rendering ineffective both of said hydraulic means; means for moving said snubbing mechanism to ineffective position; and means for releasing said brake prior to the movement of said spindle from said loading station.

18. A spindle positioning mechanism for a machine tool of the type having a rotatable spindle and a power drive source for rotating the same, comprising in combination, a gear on said spindle; a pivotally-mounted reciprocable rack; means for moving said rack into meshing relationship with said gear; means for moving said rack to its limit of motion in one direction to cause the turning of said spindle when its power drive source is disconnected; and a snubbing member adapted to cooperate with means on said spindle for limiting and stopping the turning of said spindle at a predetermined rotative position.

19. Apparatus comprising in combination, a carrier adapted to support a plurality of rotatable work-supporting spindles, and adapted to be moved in a manner to cause said spindles to be moved toward and from a work-loading station; means for causing said work-supporting spindles to be rotated around their respective axes; means for disengaging the drive of said work-supporting spindles as they approach said work-loading station; brake means adapted to be rendered effective by the movement of said carrier for stopping the rotation of a spindle as it approaches the work-loading station; means for releasing said brake means upon the stopping of said spindle; snubbing means adapted to be moved into effective position when a work-supporting spindle is at the work-loading station; auxiliary spindle-turning mechanism adapted to be rendered effective when said work-supporting spindle is at said loading station; means for causing cooperation between said auxiliary work-supporting spindle-turning means and said snubbing means to index and stop said work-supporting spindle at a predetermined rotative position; means for re-applying said brake upon said spindle being stopped in said predetermined rotative position; means for rendering ineffective said auxiliary spindle-turning mechanism upon said spindle being stopped in said predetermined rotative position; means for rendering ineffective said snubbing means after said spindle has been stopped in said predetermined rotative position; means for releasing said brake prior to the movement of said spindle from said loading station; and means for engaging the drive of said work-supporting spindles as they move away from the work-loading station.

No references cited.